Patented Dec. 22, 1931

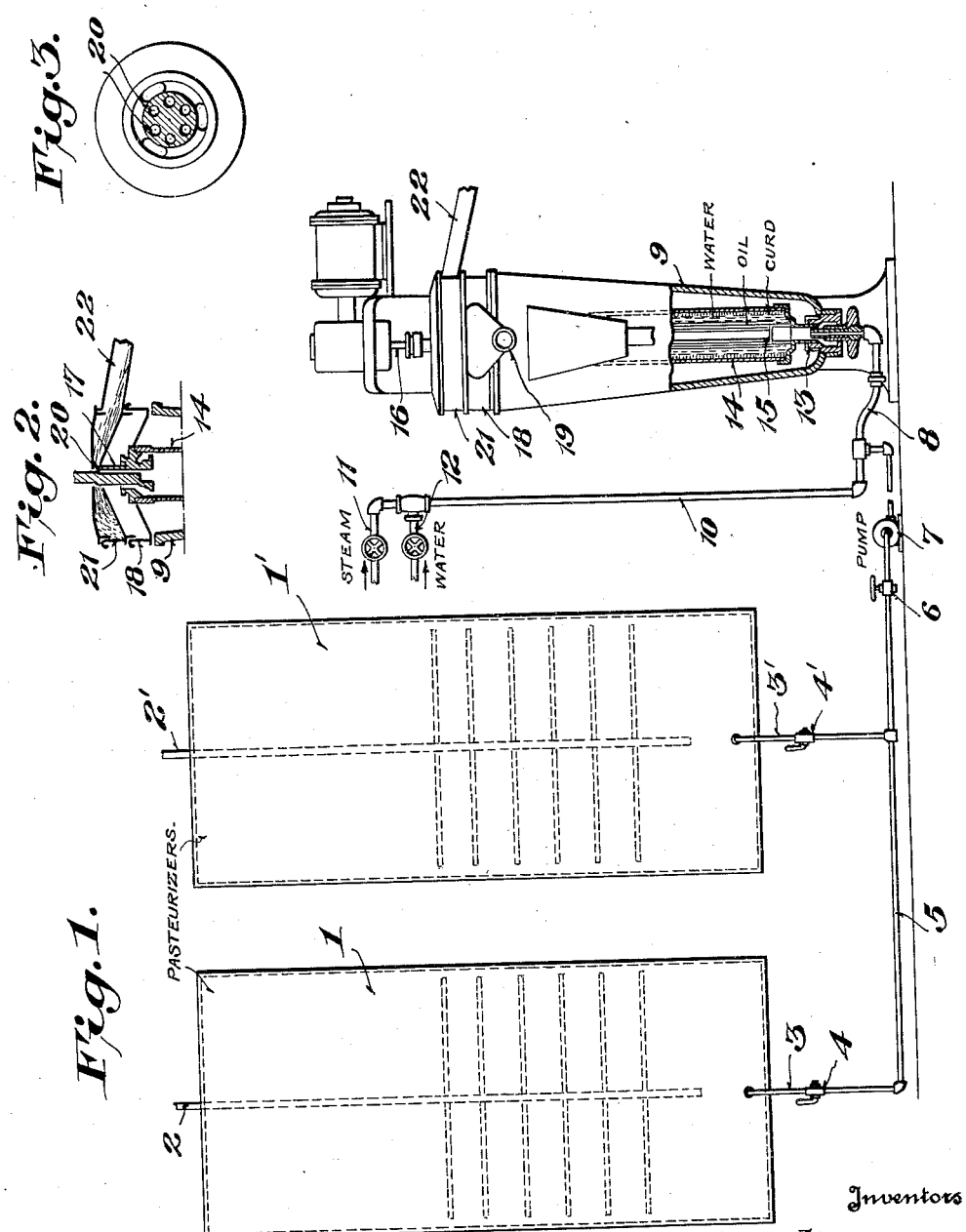

1,837,205

UNITED STATES PATENT OFFICE

HOMER CLOUKEY, OF LANSDOWNE, AND LEE H. CLARK, OF VILLANOVA, PENNSYLVANIA, ASSIGNORS TO THE SHARPLES SPECIALTY COMPANY, OF PHILADELPHIA, PENNSYLVANIA, A CORPORATION OF DELAWARE

MANUFACTURE OF PURE MILK FAT

Application filed January 25, 1930. Serial No. 423,488.

Our invention relates to the manufacture of pure milk fat and makes possible the effective and economical production of pure milk fat from butter regardless of whether the butter is of high quality or of poor quality or of undesirable flavor. The pure milk fat produced by this process is free from all but a trace of moisture that is normally soluble in the melted fat, and from curd, salts and undesirable odors and flavors. This application is a continuation in part of our copending application filed May 6th, 1925, Serial No. 28,299.

The principal difficulties encountered in separating milk fat from the water and curd normally found in butter result from the condition of the curd in the butter. This curd is primarily casein, precipitated by the action of salts and of free butter acids on the calcium caseinate of the milk. When the butter is melted the curd agglomerates into coarse aggregates. If the melted butter is allowed to stand to effect separation by gravity or subsidence, the curd forms a layer intermediate between the oil and water layers. This curd is well wetted by oil and for the most part remains in its intermediate position, although some small amount may settle below the water layer after standing. The intermediate curd layer holds a great deal of the fat intimately mixed with it in a coarse emulsion formation with some water. Hence it is difficult to obtain a recovery of anything like the total amount of oil present in the original butter or to secure such oil, or milk fat, in a clean dry condition. If the butter is salted, or has developed free butter acids, this condition is accentuated.

The separation of the milk fat from such a mixture by centrifugal means is difficult because substantially all of the coagulated casein deposits in the bowl of the machine during the centrifugal operation, thereby necessitating frequent interruptions of the operation for the purpose of bowl cleaning. The curdy characteristics of casein causes the occlusion of a relatively high quantity of good oil in the casein that deposits in the machine, and, since this casein is normally a waste product in the process, this occluded fat is lost. Moreover the character of the curd is such that it is difficult to cause all of the curd to enter the water layer and to settle below it, since the curd is apparently wetted by oil, and small particles float in the oil layer and are discharged with the oil, and constitute an undesirable impurity in the oil.

We have found that these difficulties may be overcome by the judicious addition of an alkaline reagent to melted butter. When there is added to the melted butter such a reagent having the properties and added in the proportions herein described, the curd present in the butter is caused to be selectively wetted by water and the passage of the curd from the oil into the water is facilitated. We prefer to use lime water or milk of lime as the aqueous alkaline reagent because calcium is a constituent of milk casein and the reaction of lime with the curd is easily controlled. However, other alkalies, such as caustic soda, magnesia or magnesium hydrate, or the oxide or hydrate of other alkaline earth metals, may be employed if carefully handled as hereinafter set out.

After the proper treatment of butter with an alkaline reagent the curd does not occlude an appreciable amount of oil and, when the melted butter mixture is centrifuged some of the curd remains suspended in the water and does not deposit in the centrifugal bowl but is discharged as a suspension in the separated water. Under the action of gravity a layer of reasonably clear fat may form on the top of butter that has been subjected to alkaline treatment in accordance with this invention but a layer of emulsion forms between such fat layer and the aqueous layer. Centrifugation of the alkali treated butter effects the resolution of any emulsion tending to form and gives not only a more complete recovery but a clearer oil than can be obtained readily by gravity settling even when the butter has been subjected to treatment, as above described, before such gravity settling. Moreover centrifugal separation obviates necessity for the maintenance of the treated butter at an elevated temperature for the long period of time required for gravity separation and avoids impairment of the quality of the fat resulting from prolonged heating. Preferably the centrifugation is effected by means of a centrifugal machine having a tubular bowl with an imperforate wall.

It is important not to add too great an amount of lime since an appreciable excess of alkali leads to troubles that are more difficult to overcome than those encountered in separating fat from the original butter without the assistance of this invention. In practice, we have found that the proper extent to which alkali should be added may be detected by the use of litmus paper as an indicator. The addition of lime to the point at which phenolpthalein indicator shows alkalinity is detrimental to the successful operation of the process.

We have found that fresh unsalted butter may be treated by the simple addition of the necessary amount of lime water or milk of lime to produce neutrality, as described above, and that the curd will be in a condition to permit satisfactory separation by centrifugal means. Salted butter, even of the highest grade, requires the addition of approximately 10% of water, which water may be water contained in the added alkaline solution. Butter of bad odor and taste requires the addition of greater quantities of water, 25% of water usually being sufficient and water in excess of what is necessary being harmless except that it inefficiently utilizes the capacity of the apparatus. Intermediate grades of butter require the addition of water in proportionate amounts, it being important to use such volume of water that the dissolved salts are well diluted.

The lime or other alkaline reagent used combines with acids present in the butter, and such compounds are eliminated from the fat together with the water that is separated during the centrifugal operation or with the solids retained in the centrifugal bowl, thereby eliminating those products of rancidity and decomposition that are undesirable in the finished milk fat.

From the foregoing it is apparent that in accordance with our invention butter that may or may not possess undesirable odor or flavor is melted and then mixed with a reagent comprising water containing an alkali in solution or suspension, the quantity of alkali so added being carefully limited to bring the mixture to a condition in which it is neutral and is not alkaline, and the curd is then in a condition in which it is wetted by water and separable from the fat. In view of the limitations of even litmus paper as an indicator of neutrality and the desirability of avoiding alkalinity of the mixture, its condition will apparently be between weak acidity and absolute neutrality. If an excess of alkali is added the curd is converted into calcium caseinate which is soluble in the water and a viscous gluey mass results from which the oil cannot be separated. Casein forms glue in the presence of alkali. An excess of alkali causes the casein to become soluble and a ropy sticky emulsion results from which the oil cannot be separated. The casein no longer exists as solids suspended in the water and the substance discharged from the centrifuge is a valueless emulsion of fat and gluey material. In the careful practice of this invention, adding alkali only to such an extent that the mixture is neutral by litmus paper test, an extremely important result is that the solids become wetted by the water instead of being wetted by the fat and they pass, or by centrifugal force are caused to pass, into the aqueous phase of the mixture in a state in which they are substantially free of fat; and in the aqueous phase of the mixture they are in large proportion in suspension and pass from the centrifuge with the water and do not accumulate in the centrifuge so rapidly that cleaning of the rotor must be so frequently performed as to defeat the efficiency of the operation. Fat produced in the practice of this invention is extremely clear and will keep for many months without refrigeration and the solids removed from the fat are substantially free of oil. These results cannot be obtained by settling or by centrifuging melted butter that has been treated with no alkali or with too little alkali or with more alkali than is necessary to bring the mixture to neutrality as indicated by litmus paper. The correct alkali treatment in accordance with this invention eliminates the formation in the centrifugal bowl of an intermediate layer containing oil emulsified with water or mixed with curd.

Because of the necessity for treating the butter with the correct amount of alkali, calcium hydrate and magnesium hydrate are preferable. However, sodium hydroxide may be employed but its use requires extreme care. When using sodium hydroxide, local action may produce soap and impair the flavor of the recovered fat, before the solution can be thoroughly mixed with the oil; and an excess of sodium hydroxide may enter the mixture in spite of great care on the part of the operator. For this reason sodium hydroxide should be used only in the form of a very dilute solution in order to facilitate control of the quantity of alkali added to the mixture and in order to minimize the possibility of local saponification. The large quantity of water necessary when using sodium hydroxide reduces the capacity of the apparatus. The amount of alkali suspension or solution that must be added must be determined in the treatment of each separate batch of butter and while we have found that the addition of enough alkali to bring the mixture substantially to neutrality as indicated by litmus paper will give satisfactory results, it is important that a result of such treatment is that the character of the solids is so changed by such alkaline treatment that they pass into the water and are not wetted by oil and do not carry oil with them and remain in suspension in the water to a substantial extent. The changing of the character of the solids under such alkali treatment is readily observable. The reagents above mentioned, when used in the proportion indicated, will effect this change in the physical nature of the solids and centrifuged oil is free from undesirable odors and flavors and no subsequent treatment of the recovered oil for removal of odor or flavor or for any purpose is necessary. In practice each batch of butter treated is usually composed of quantities of butter of varying character and it is therefore preferable that the alkaline reagent be added to the melted butter in the agitating tanks and that the mixture be repeatedly tested during the neutralizing operation to ensure that such additions do not make the mixture alkaline, as each lot of butter treated will require a different quantity of alkali—only the quantity suited to its nature—to prepare it for the separation of fat therefrom.

In the accompanying drawings, Fig. 1 represents diagrammatically the layout of a plant adapted for the practice of our process, the centrifuge being shown upon an exaggerated scale for the sake of clearness; Fig. 2 is a fragmentary sectional view of the upper part of the centrifuge; and Fig. 3 is an enlarged transverse sectional view of the bowl top illustrating the arrangement of water and oil discharge ports of the centrifuge rotor.

As illustrated in the drawings, our improved process may be advantageously practiced by the use of apparatus comprising a pair of steam-heated, water-jacketed pasteurizers 1 and 1' containing motor driven agitators 2 and 2' and discharging through pipes 3 and 3', controlled by valves 4 and 4', to the conduit 5 controlled by a valve 6. A pump 7 has its inlet or suction port connected with the conduit 5 and its discharge or pressure port connected with the supply pipe 8 of a centrifuge 9. Steam or/and water are admissible to the supply pipe 8 through a branch pipe 10, the admission of steam and water being controlled by valves 11 and 12. The supply pipe 8 communicates with a nozzle 13 which discharges into the tubular rotor 14 and against the spreader 15 in the bottom thereof. The rotor is suspended from and driven through the spindle 16 and has in the top thereof the ring dam 17 which regulates the discharge of the constituents separated within the rotor. The heavier liquid constituent is discharged into the cover 18 having a spout 19. The lighter liquid constituent passes in fine streams through the small concentrically arranged orifices 20 in the bowl top into the cover 21, being thereby atomized and aerated within the cover before flowing out through the spout 22 thereof.

In the commercial practice of our invention, which is given by way of example, a suitable quantity of butter is agitated in a tank 1 with an amount of water that varies with the character of the butter being treated, as previously described, the mixture being heated to a temperature of approximately 160° F. There is then added to the mixture a neutralizing alkaline reagent preferably in water and usually consisting of lime, the quantity required being determined as heretofore described.

When the centrifuge rotor 14 is started, the valves 11 or 12 are opened to admit steam or hot water thereto to preheat the rotor, but as soon as flow through the rotor is established, the water or steam is shut off. The shutting off of the water is followed immediately by the opening of the valves 4 and 6 and the starting of the pump 7 which forces the butter mixture under pressure into the rotor 14.

The butter mixture in the rotor is separated into an outer stratum or layer of curd or sludge, an intermediate layer of water carrying suspended curd or curd in colloidal solution, and an inner layer of butter oil surrounding an axial vapor space.

The water and suspended curd are discharged into the cover 18, from which they escape through the nozzle 19 to a waste pipe. The milk fat is discharged in very fine streams through the ports 20 into the cover 21. The fineness of the streams in which the butter oil is discharged effects the atomization of the butter oil in the cover 21 and the exposure of extended oil surfaces to the air, with resulting thorough aeration thereof before discharge through the spout 22.

It will, of course, be understood that other alkalies may be used in place of the lime and that the extent to which the butter and the fat produced is subjected to the respective steps of the process is variable with the character and condition of the butter treated and the degree of purity desired in the final product.

It will be further understood that the term "milk fat" as used herein is intended to comprehend such fat in either solid or liquid form, the latter being some times designated "butter oil."

We claim:
1. In the recovery of milk fat the steps comprising melting butter, agitating the melted butter and during the agitation thereof adding a quantity of weak aqueous alkaline reagent sufficient to cause the curd of the butter to pass from the fat into the water phase of the mixture and so limited that the resulting mixture by litmus paper test is substantially neutral and is not alkaline, and centrifugally separating the milk fat from the non-fatty substances of the resulting mixture.

2. In the recovery of milk fat the steps comprising melting butter, agitating the melted butter and during the agitation thereof adding a quantity of water and the hydrate of an alkaline earth metal sufficient to cause the curd of the butter to pass under centrifugal force from the fat into the water phase of the mixture and so limited that the resulting mixture by litmus paper test is substantially neutral and is not alkaline, and centrifugally separating the milk fat from the non-fatty substances of the resulting mixture.

3. In the recovery of milk fat the steps comprising melting butter, agitating the melted butter and during the agitation thereof adding a quantity of water and calcium hydrate and magnesium hydrate sufficient to cause the curd of the butter to pass under centrifugal force from the fat into the water phase of the mixture and so limited that the resulting mixture by litmus paper test is substantially neutral and is not alkaline, and centrifugally separating the milk fat from the non-fatty substances of the resulting mixture.

4. In the recovery of milk fat the steps comprising melting butter, agitating the melted butter and during the agitation thereof adding a quantity of water and calcium hydrate sufficient to cause the curd of the butter to pass under centrifugal force from the fat into the water phase of the mixture and so limited that the resulting mixture by litmus paper test is substantially neutral and is not alkaline, and centrifugally separating the milk fat from the non-fatty substances of the resulting mixture.

In testimony whereof, we have signed our names to this specification.

HOMER CLOUKEY.
LEE H. CLARK.